UNITED STATES PATENT OFFICE.

JAMES D. WHELPLEY, OF BOSTON, MASSACHUSETTS.

IMPROVED FERTILIZER.

Specification forming part of Letters Patent No. 49,943, dated September 12, 1865.

*To all whom it may concern:*

Be it known that I, J. D. WHELPLEY, of Boston, in the county of Suffolk and State of Massachusetts, have invented a new and useful Improved Fertilizer; and I do hereby declare that the following is a full, clear, and exact description of the construction and operation of the same.

The purpose of my invention is to bring together in a suitable condition to become the food of plants those chemical elements which are most important in stimulating the growth of vegetable organisms—viz., sulphur, phosphorus, potassium, sodium, calcium, and nitrogen.

As my fertilizer is intended more especially for soils which have been injured by the cultivation of tobacco, it contains (what few artificial fertilizers do at present) a certain proportion of potash in such a condition that it will not be immediately absorbed by the rain-water of the soil and carried down out of reach of the plants, but be taken up by the plant from season to season. By this means the same conditions will be obtained for potash that are secured for phosphate of lime in the use of very finely pulverized bone—viz., its gradual communication to the roots of plants without waste by water-wash, all soluble fertilizers being open to this objection. A fertilizer, to give up all of its virtue to the crops, should act slowly, the fertilizing element being the product of a slow decomposition.

It is well known that certain varieties of granite and other hard rocks contain a considerable percentage of potash. The feldspar element of granite, called "orthoclase," more especially contains from twelve to fourteen per cent. of caustic potash. Soils formed by the decomposition of granite rocks containing potash are always rich when they are sufficiently moist and exposed to the air and sun. The decomposition of these rocks, however, under atmospheric influences is exceedingly slow—in fact, scarcely perceptible—unless the presence of iron in the rock makes them liable to rapid decay and decomposition.

In order to attain the same results by a different method, I propose to reduce the potash-bearing granites, or the pure feldspars selected for that purpose, to an exceedingly fine impalpable powder, whereby the susceptibility of the feldspar to decomposition is greatly increased. This perfect reduction is the first condition to be attained. The same necessity exists in regard to the ingredients and chemical reagents that are to be mixed with it. These also must be finely pulverized. Sulphate of lime (gypsum) is slightly soluble in water. This condition makes it a useful fertilizer—in fact, one of the best for soils that require sulphur. I pulverize gypsum (sulphate of lime) in conjunction with feldspar or a rock containing a large proportion of feldspar. When moisture is added to the mixture of the two, more especially the moisture of soil and rain-water, (containing always carbonic acid and soluble carbonates,) a very slow and gradual decomposition takes place, by which the potash is liberated in the form of soluble salts of potash. The merit of my invention consists in my using the soluble salts of potash originated in the manner described, and in combination with phosphates and gypsum.

As the quantity of potash absorbed by plants is exceedingly small in proportion to the entire weight of the plant, it will not be necessary to make more than one-fourth of the artificial fertilizer to consist of pulverized feldspar.

I attain the end above described by several methods, either of which produces the same result.

It is well known that the addition of diluted sulphuric acid to broken bones produces a mixture of sulphate and phosphate of lime, forming the ordinary soluble phosphate fertilizer, in which the nitrogen, phosphorus, and sulphur are all retained in the soluble form. To a certain proportion of this chemical result I add, during the process of the action and fermentation of the acid, a certain quantity —say fifty per cent., by weight—of finely-pulverized feldspathic granite or other form of potash-bearing rock. The pulverization of the feldspar must be complete and effectual; otherwise the result will not be attained.

It will be seen that the object of this process is to bring gypsum, or sulphate of lime, at the instant of its chemical formation, in contact with silicate of potash in the feldspar.

Another method of obtaining the same result may be described as follows: I mix together a certain proportion—say fifty per cent.—of crude sulphuret of iron (sulphide of iron, or, if this cannot be obtained, sulphate of iron) with oyster-shells or other form of carbonate of lime. I pulverize the two finely together, equal parts, more or less, adding to the two at the same time an equal quantity of finely-pulverized bone and finely-pulverized feldspar, so that in the process of pulverization the four ingredients may be equally and intimately intermingled, as follows: feldspathic granite, one ton; bone, one ton; shell-lime, one ton; sulphide or sulphate of iron, (crude,) one ton, more or less.

The proportions of the above may be varied, according to the cost and quality of the material, so as to obtain a good commercial result. Subject this mixture to a very moderate heat, below a red heat, on the floor of a reverberatory furnace, or the floor of any common oven, taking care to furnish moisture by wetting the mass from time to time; or, secondly, the same pulverized mass may be exposed to the action of sun and air, either by itself or in a heap with other manure, in a yard or upon a platform exposed to moisture. In either case the same result will follow—namely, the formation of sulphate of lime and the liberation of the soluble salts of potash as a consequence. Lastly, I pulverize together bone, gypsum, and feldspathic granites (dry) in equal proportions, or in other proportions convenient, adding water subsequently before using the compound as a fertilizer.

Having thus described the nature of my invention, what I claim as new, and desire to secure by Letters Patent, is—

As a new article of manufacture, a fertilizer consisting of finely-pulverized feldspar, feldspathic granite, and other potash-bearing rock, in combination with gypsum and bone or phosphate of lime, substantially as described.

JAMES D. WHELPLEY.

Witnesses:
N. AMES,
GEO. R. CLARKE.